United States Patent [19]
Chang et al.

[11] Patent Number: 5,461,023
[45] Date of Patent: Oct. 24, 1995

[54] STORAGE OF NATURAL GAS

[75] Inventors: Chin-Hsiung Chang, Palatine; Gary J. Seminara, Chicago; Alan E. van Til, Itasca, all of Ill.

[73] Assignee: AlliedSignal Inc., Morris Township, Morris County, N.J.

[21] Appl. No.: 156,859

[22] Filed: Nov. 23, 1993

Related U.S. Application Data

[63] Continuation-in-part of Ser. No. 906,995, Jul. 1, 1992, abandoned, and a continuation-in-part of Ser. No. 964,174, Oct. 21, 1992, Pat. No. 5,292,706.

[51] Int. Cl.$^6$ .................................................. B01J 20/20
[52] U.S. Cl. ........................ 502/418; 502/430; 502/432; 502/437
[58] Field of Search ...................... 502/416, 418, 502/432, 436, 437, 526, 180, 181, 430

[56] References Cited

U.S. PATENT DOCUMENTS

| | | | |
|---|---|---|---|
| 3,937,439 | 2/1976 | Tyler et al. | 502/437 |
| 4,820,318 | 4/1989 | Chang et al. | 502/437 |
| 4,820,681 | 4/1989 | Chang et al. | 502/418 |
| 5,071,820 | 12/1991 | Quinn et al. | 502/434 |
| 5,292,706 | 3/1994 | Chang et al. | 502/437 |
| 5,292,707 | 3/1994 | Aparicio et al. | 502/437 |

OTHER PUBLICATIONS

Matranga et al., Chem. Eng. Sci., vol. 47, No. 7, pp. 1569–1579 (1992).
Barton et al., "High Pressure Adsorption of Methane on Porous Carbons" Fundamentals of Adsorption 1st Eng. Foun. Conf. 1984 p. 65.
G. Horwath & J. Kawozoe, J. Chem. Eng. Japan 16 (6) 470 (1983).
Barton et al., "The Development of Adsorbent Carbon for the Storage of Compressed Natural Gas", Ontario Ministry of Trans. and Comm. (May 1985).

*Primary Examiner*—Anthony McFarlane
*Attorney, Agent, or Firm*—Harold N. Wells; Roger H. Criss

[57] ABSTRACT

Natural gas is stored in a closed vessel under a pressure of about 1400 to 4500 kPa using a carbon molecular sieve adsorbent having at least 80% of its particle pore volume as micropores having diameters greater than 0.55 nm and less than 0.65 nm, particularly about 0.6 to 0.65 nm. The capacity of such micropores for methane is at least 110 mL methane per mL of carbon (at 300 psig or 2,169 kPa abs.). The deliverable volume of natural gas from a vessel packed with carbon molecular sieve particles is at least 70 times the volume of the vessel. The deliverable volume is optimized by heating a carbonized polymer in the presence of carbon dioxide to increase the pore volume.

14 Claims, 4 Drawing Sheets

STORAGE OF NATURAL GAS

CROSS REFERENCE TO RELATED APPLICATIONS

This is a continuation-in-part of application Ser. No. 07/906,995, filed Jul. 1, 1992, now abandoned, and application Ser. No. 07/964,174, filed Oct. 21, 1992, now U.S. Pat. No. 5,292,706.

BACKGROUND OF THE INVENTION

This invention relates to a method of storing natural gas. More particularly, the invention relates to storage of natural gas at near ambient temperatures using a solid adsorbent, in particular, a carbon molecular sieve.

In U.S. Pat. No. 4,820,681 two of the present inventors have disclosed an improved carbon molecular sieve which has a high capacity for carbon dioxide and may be characterized as hydrophobic, requires no binders, and may be carbonized in a single step.

Natural gas, being substantially methane, has a low molecular weight and it occupies a large volume per unit weight compared to liquid fuels. Thus, reducing the volume of natural gas is necessary for most practical applications of natural gas as a fuel. Methods for doing this could include (1) storage at high pressure, (2) liquefaction and storage at low temperatures, and (3) adsorption on solids. Of these methods the last is of particular interest since compact storage of natural gas at moderate pressures may be achieved, while avoiding the cryogenic temperatures needed for liquid natural gas or the high pressures needed for storage as a gas in reasonable volumes.

Conventional activated carbons have been found to have reasonable capacity for natural gas but higher capacity is believed necessary for commercial success. Inorganic zeolites have also been tried, but found to have relatively low capacity for natural gas. Carbon molecular sieves also have been suggested for adsorption of natural gas. The present inventors have sought improvements in the storage of natural gas and have found the materials and methods to be disclosed below.

BRIEF SUMMARY OF THE INVENTION

Natural gas is stored at near ambient temperatures and at pressures of about 100–900 psig (791 to 6305 kPa abs.) on a carbon molecular sieve having a capacity for said natural gas greater than 110 mL per mL of carbon at 300 psig (2,169 kPa abs.) preferably greater than 145 mL per mL of carbon. Preferably, the pressure is about 200–600 psig (1479 to 4234 kPa abs.) and the temperature is about 10° to 50° C. The carbon molecular sieves are particles characterized by having a pore volume of at least 0.4 mL/g and at least about 80% of the total particle pore volume consisting of micropores having diameters greater than 5.5 Å (0.55 nm) and less than 6.5 Å (0.65 nm). Typically, as initially formed the micropores have diameters substantially between 5 and 6 Å (0.5 and 0.6 nm) and have a slit-like shape. Larger pores are created by an activation step. The carbon particles preferably are shaped as spheres, as cylinders having an aspect ratio of about 1/1, or as flat disks.

In one embodiment the carbon molecular sieve is derived from carbonization in an inert atmosphere of an oxygen-free polymer, preferably poly(vinylidene chloride) (PVDC). In one embodiment the carbonization process is carried out in the presence of carbon dioxide.

In another embodiment, the invention includes a process for preparing a carbon molecular sieve by polymerizing vinylidene chloride in a two-phase solution including a suspending agent, such as hydroxypropyl methyl cellulose or related compound in the aqueous phase and a polymerization initiator in the organic phase. The two-phase mixture is heated to about 40° to 80° C. and maintained at that temperature until all the vinylidene chloride has been polymerized. Then, the polymer is recovered and carbonized in an inert atmosphere to produce a carbon molecular sieve. Heating in the range of about 140° to 180° C. is limited to a rate up to about 25° C./hr, preferably about 2° to 10° C./hr in order to increase the particle density.

The carbonized polymer preferably is activated by heating in an atmosphere containing steam, carbon dioxide, or oxygen to optimize the fraction of the pores which are within the desired pore size range (5.5–6.5 Å)(0.55–0.65 nm) and to increase the micropore volume and thereby optimize the deliverable volume of natural gas. Preferably, the activation is carried out in an inert atmosphere containing an effective amount of $CO_2$ at a temperature of at least 750° C.

When packed in a vessel the carbon molecular sieves can adsorb natural gas at 300 psig (2,169 kPa abs.) and deliver at 0 psig (101.32 kPa abs.) at least 70 times the volume of the vessel, preferably at least 95 times the vessel volume, most preferably at least 110 times the vessel volume.

DETAILED DESCRIPTION OF THE INVENTION

Natural Gas Storage

An important potential use for natural gas is as a fuel for vehicles. It will be evident that the size and weight of the fuel tanks for such vehicles will be an important consideration. Conventional gasoline tanks provide efficient energy storage. However, storing natural gas efficiently is more difficult. The tanks must hold enough natural gas to provide an acceptable operating range and still not occupy too much space or add too much weight to the vehicle. Liquified natural gas occupies the least space, but requires a temperature of about −162° C., which is too low to be considered for most applications. High pressure natural gas, say in the range of 2000 psig (13.9 MPa abs.) to 3600 psig (25 MPa abs.), is feasible but the high pressures require heavy and expensive vessels which can be fueled only from rather expensive equipment. It is unlikely that such high pressure would be acceptable or feasible except for a captive fleet of short range vehicles which could be fueled at a central location. Lower pressures of about 300 psig (2,169 kPa abs.) to 900 psig (6,305 kPa abs.) are considered to present an optimum choice for natural gas fueled vehicles.

It has been shown that adsorbents may be useful for low pressure storage of natural gas and carbons have been found to have higher capacities for natural gas than other solid adsorbents such as zeolites, silica gel, and alumina. Even so, not all carbons have adequate capacity to meet the standards considered necessary for practical applications. As will be seen, the carbon molecular sieves of the present invention are superior to others and provide a higher capacity for natural gas. Another advantage for carbon compared to other adsorbents is its lower tendency to adsorb impurities in the natural gas which could decrease the storage capacity for the natural gas. Since the carbon molecular sieves of the invention are typically hydrophobic, they avoid loss of capacity resulting from adsorption of water as well as adsorption of $CO_2$ or other impurities.

Natural gas will be stored in the pores of the carbon and in spaces around the carbon particles. There is believed to be an optimum pore size for natural gas adsorption since the pores do not just hold compressed gas, but cause the gas molecules to behave as if more highly compressed, that is, to have a higher density than the gas normally has at the storage pressure. Thus, it follows that the volume of such optimum size micropores in a carbon particle should be as large as possible to maximize gas storage. Gas in the void spaces around the carbon would be expected to have its normal density and therefore, these spaces should be minimized. Thus, the carbon should have the highest possible packing density. Another factor to be considered is the need to provide for access to the carbon so that the natural gas can be efficiently stored and recovered. For that purpose larger pores are believed to be needed, say about 20 to 500 Å (2 to 50 nm). These have been termed meso pores. Larger pores, i.e. above 500 Å (50 nm) are considered macro pores. In a vessel packed with carbon molecular sieve particles, natural gas can be stored in the micropores, the meso and macro pores, and in the void volume. Preferably the largest possible fraction of the volume should be in the micropores.

Carbon Molecular Sieves (CMS)

Figure 3:
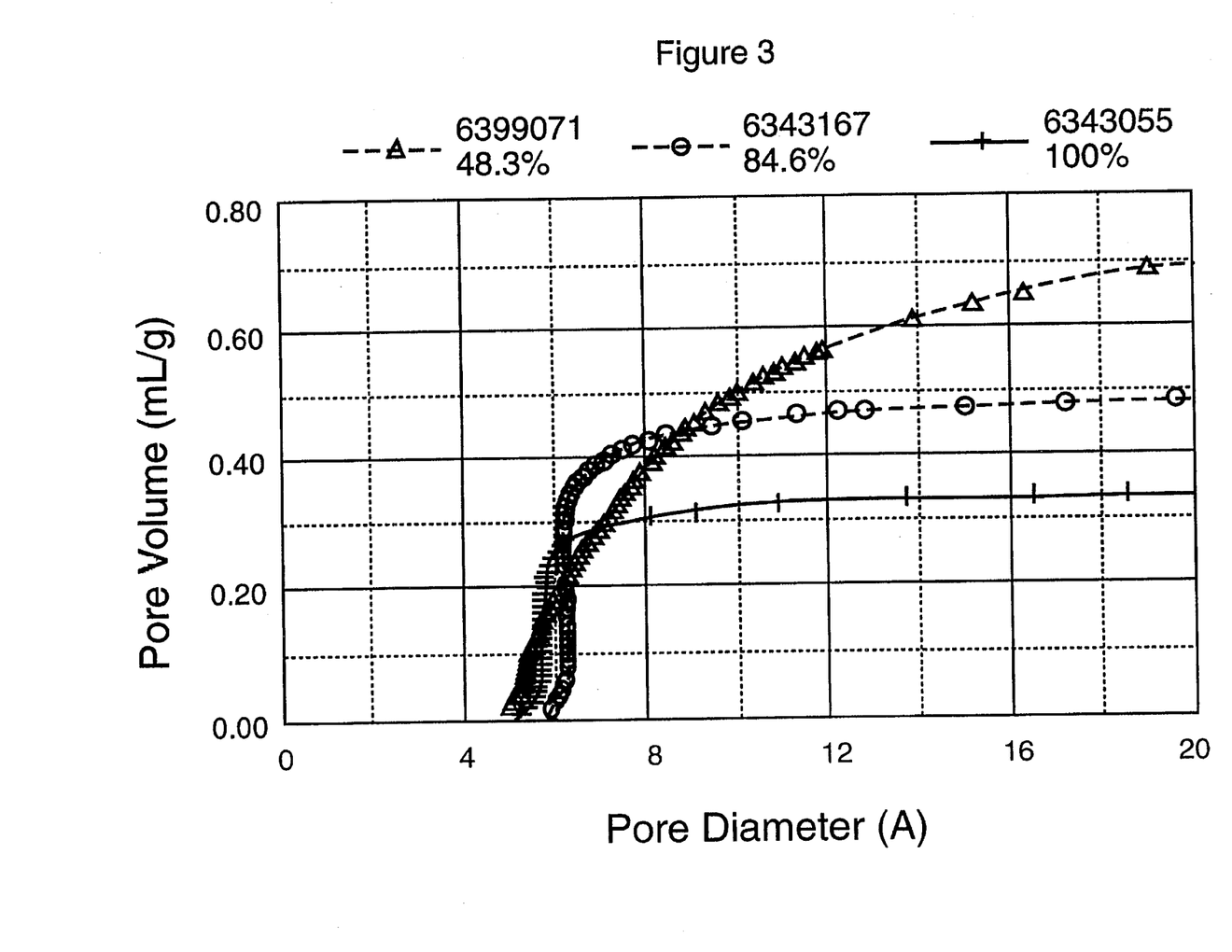
FIG. 3 is a plot of pore diameter vs. pore volume for carbon molecular sieves as prepared and after the activation steps.

The carbon molecular sieves and activated carbons made by prior art methods using waste materials from the manufacture of Saran or other low cost feedstocks are considered inferior to the adsorbent of the present invention for the storage of natural gas since they have not been optimized for the desired properties. A distinction should be made between carbon molecular sieves of the invention and activated carbons. The activated carbons are characterized by the relatively smooth curve obtained when one plots the accumulated pore volume against the pore size, that is, the pore volume will be rather evenly distributed over a wide range of the pore sizes. In contrast, a carbon molecular sieve will have much of its volume at substantially a single pore size and a plot of pore volume versus pore size will show a substantially vertical portion of the curve. This can be seen particularly in FIG. 4. The principal pore size can be changed for carbon molecular sieves of the invention by suitable activation procedures, but excessive activation results in a material which is similar to activated carbon rather than to a molecular sieve in that the characteristic vertical section of the curve is lost, as illustrated in FIG. 3.

Hydrophobic carbon molecular sieves (CMS) for the adsorption of natural gas are produced by a unique method. This method comprises three steps: (1) polymerization of an oxygen-free monomer optionally, but not preferably, in the presence of a minor amount of an oxygen-free cross-linking agent; (2) forming particles of the resultant polymer into a desired shape; and then, (3) carbonizing the shaped material in a substantially oxygen-free environment, which may include carbon dioxide in one embodiment of the invention.

The monomers should be readily polymerizable, essentially free of oxygen in their molecular structure and preferably consisting of hydrogen, a halogen, and carbon. Among the materials which may be employed as the monomer are acrylonitrile (AN), vinylidene fluoride (VDF), chlorotrifluoroethylene (HALAR), vinylidene chloride (VDC), mixtures of two or more monomers such as mixtures of vinylidene chloride and vinyl chloride, vinylidene chloride and acrylonitrile, and a mixture of styrene and divinylbenzene. Other monomers include vinyl fluoride, vinyl bromide, chlorinated ethylene, chlorofluoroethylene, vinyl chlorobenzene, vinyl idene bromide and vinylidene-fluoride-chlorotrifluoro-ethylene. The preferred monomer is vinylidene chloride, most preferably alone, i.e. without a cross-linking agent.

Several methods of polymerization may be employed. Bulk polymerization is the direct conversion of liquid monomer to polymer in a reaction system in which the polymer remains soluble in its own monomer. Solution polymerization uses a solvent capable of dissolving the monomer, the polymer, and the polymerization initiator. Suspension polymerization and emulsion polymerization have also been used to produce materials having the same level of desired properties, contrary to the previous findings of U.S. Pat. No. 4,820,681. In suspension polymerization, the monomer is dispersed rather than dissolved in the medium, with water being a typical suspension medium. In emulsion polymerization, a suspended particle of colloidal size will be the site of the polymerization. The initiator is dissolved in the monomer, the monomer is dispersed in water, and a dispersing agent is incorporated to stabilize the suspension formed. Precipitation polymerization and vapor phase polymerization may also be suitable.

The polymers produced in the initial polymerization step optionally may be cross-linked with a substantially oxygen-free cross-linking agent. The cross-linking agent will typically be present during the polymerization at a concentration equal to less than 10 mole percent of the monomer preferably less than 5 mol. %, and most preferably less than 1 mol. %. A preferred cross-linking agent is divinylbenzene. Other possible cross-linking agents include trivinyl benzene, divinyl acetylene, and divinyl sulfide.

As the production of carbon molecular sieves from polymers containing no oxygen is desired, the polymerization initiator is also preferably an oxygen-free compound. Therefore, a carbon or azo rather than an oxygen initiator is preferably used. One suitable non-oxygen containing initiator is 2,2'-azobis(isobutyronitrile), (AIBN). Another suitable polymerization initiator is the compound 2,2'-azobis (2,4-dimethylvaleronitrile) which is available from DuPont Chemical Company and is sold under the trade VAZO 52.

If the precursor polymer is produced by solution polymerization, a number of different solvents may be employed. Typical solvents include normal hexane, chloroform, carbon tetrachloride, orthodichlorobenzene, and 1,1,2,2-tetrachloroethane. Of these materials, orthodichlorobenzene and 1,1,2,2-tetrachloroethane are preferred. General characteristics for the selection of a solvent include a high-solubility for the monomer, the absence of oxygen in the molecular structure, and a large difference in boiling point between the solvent and the monomer. A weight ratio between monomer and solvent between 1:1 to 1:2 will normally be suitable.

When suspension or emulsion polymerization is used, the monomer is usually suspended or emulsified in water. The ratio of the monomer to the suspending fluid is about 0.1–1 to 1. A suspending agent, such as hydroxypropyl methyl cellulose is added in amounts of about 0.1 to 2%. Related compounds may also be used such as poly vinyl alcohol and Polyox (WRPA 3154) from Union Carbide.

For ease in fabricating the polymer into a desired shape, it is preferably reduced in size to small free-flowing particles, which may be shaped into a desired configuration by conventional means. A preferred form is a cylindrical pellet having an aspect ratio (diameter×height) of about 1/1. When suspension polymerization is used, the polymer is produced as spherical particles which may not require additional shaping.

The polymeric material is carbonized by heating to a high temperature in the presence of an inert gas such as nitrogen or helium. The concentration of oxygen in the atmosphere surrounding the particles undergoing carbonization should be less than 0.1 mole percent and is preferably less than 0.05 mole percent. The carbonization will result in the evolution of a hydrogen halide. Preferably the inert gas should be flowing at a sufficient rate to remove this material from the particles. It is preferred that prior to high temperature carbonization the polymer be heated slowly in the range of 140°–180° C. (preferably about 2° to 10° C./hr) and held at this temperature for several hours. The polymer is then preferably subjected to a programmed temperature increase to a temperature above 700° C. The temperature is preferably raised at a rate greater than 50° C. per hour but less than 200° C. per hour. It is preferred to hold the final temperature for a period of at least 45 minutes and preferably for at least one hour. A preferred rate of programmed heating is 75°–125° C. per hour. The highest temperature is normally required for less than 5 hours. The required holding period can be determined by weight loss measurements.

Only a single carbonization step is needed. The second carbonization step of some prior art methods is not required. The second carbonization step of the prior art is done after the product of the first carbonization has been pulverized, admixed with a binder or other material such as coal tar pitch or high carbon content material and then shaped again.

Since the sieve precursors are derived from polymeric materials and include no binders, they are substantially free of the inorganic materials such as metals and inorganic oxides which may be present when the precursor material is made from a naturally occurring substance such as coal, coconut shells, peat, or wood. Materials which contain a binder will normally have impurities derived from the binder in addition to impurities present in the precursor materials. After carbonization on a hydrogen- and oxygen-free basis, the product should contain at least 99.5 wt. % carbon and preferably at least 99.8 wt. % carbon. This measurement does not include any material applied as a surface treatment or coating.

The polymeric material will shrink during the carbonization step in a proportional manner along each dimension. The amount of shrinkage is also proportional to the amount of weight loss caused by the driving off of the hydrogen halide from the shaped polymer. A cylindrical pellet will lose approximately 70 percent of its weight and size during the carbonization procedure due to the evolution of hydrogen chloride, hydrogen bromide, or hydrogen fluoride or a mixture of these gases. For PVDC-based precursors, the final carbonized material will often equal about 25 to 28 weight percent of the initial or starting polymerized material. The density of the initial material and the final carbonized material are related. That is, the density measured in terms of grams per mL of the finished carbon molecular sieves is dependent on the density of the initial uncarbonize, polymer and the carbonization process conditions.

The carbon molecular sieves of the invention as produced are hydrophobic rather than hydrophilic and thus do not preferentially adsorb water which may be present in natural gas.

Activation

The term "activation" has been used in connection with processes intended to improve the adsorptive capacity of carbons and will be used in the present iscussion to avoid confusion. However, the term "activation" often refers to the chemical treatment of a solid to change its active form, as in the activation of catalyst precursors. In the present instance, "activation" is considered to be the removal of a portion of the carbon which shifts the principal characterizing pore size aid increases the total pore volume of particles. Thus, it might be more properly termed an adjustment or optimization of the pores rather than a change of the chemical nature of the carbon.

When a precursor material is carbonized, the pores formed are not the most desirable size for methane storage and the total pore volume of a particle is less than the maximum possible. Ideally, one would want to achieve the largest pore volume at the optimum pore size and consistent with the necessary structural integrity.

Quinn et al. (U.S. Pat. No. 5,071,820) say that for storage of methane the pore size should be 10–15 Å (1–1.5 nm). The present inventors believe that the optimum size for the pores of their carbon molecular sieves is much smaller, probably between 4 and 12 Å (0.4–1.2 nm). It should be noted that there are several methods for determining pore size relative to pore volume. The present inventors consider the method of Horvath-Kawazoe (G. Horvath and J. Kawazoe, J. Chem. Eng. Japan 16(6), 470 (1983)) to be the most useful and the pore sizes given should be understood to result from this method. The measurements are made at low temperature and pressure using methane itself as the probe gas, thus the results are considered to be more representative of the performance at the higher temperature and pressure used in practical methane storage. In carbons made from polyviylidene chloride most of the pores are within a very narrow size range, as will be seen in FIGS. 1, 3 and 4. It has been found that the capacity for methane storage is significantly increased if the pores are enlarged, while retaining the characteristic plot of Fore size versus volume, as will be seen also in FIG. 1. If for simplicity one considers the pores being gradually enlarged, then it will be intuitively recognized that the capacity of each pore will be increased until some limit is reached. At some point it would be expected that so much carbon would be removed that the structural integrity of the carbon would be lost and the carbon would collapse with a consequent loss of pore volume. However, another factor must be considered. The pores are understood to be more than containers for gaseous methane, they are considered to cause the methane molecules to be held within the pores in closer proximity than in the gas phase. It is this phenomenon which provides an advantage for the use of adsorbents such as carbon, otherwise one might as well simply use an empty container, which would have a larger capacity than when filled with carbon. This quasi-condensation of methane in the pores will have its maximum effect at some pore size. Matranga et al. in Chem. Eng. Sci., Vol. 47, No. 7, pp. 1569–1579 (1992) assume in their calculations that a width equal to two molecules of methane provides the optimum performance, or a pore size of about 11 Å (1.1 nm). It is apparent that whether or not their assumption is correct, that one would expect that the pore size could not be increased indefinitely without losing capacity for methane. If a method were available for increasing t e pore size uniformly, it should be possible to identify for any given carbon the optimum pore size. However, since most carbons have non-uniform pores to some extent, it would be expected that that the actual optimum for each carbon would have to be determined experimentally. In part, the optimum size may be affected by the larger meso and macro pores which are not considered to hold methane as effectively as the micropores, but may assist the gas in entering or leaving those pores.

Figure 1:
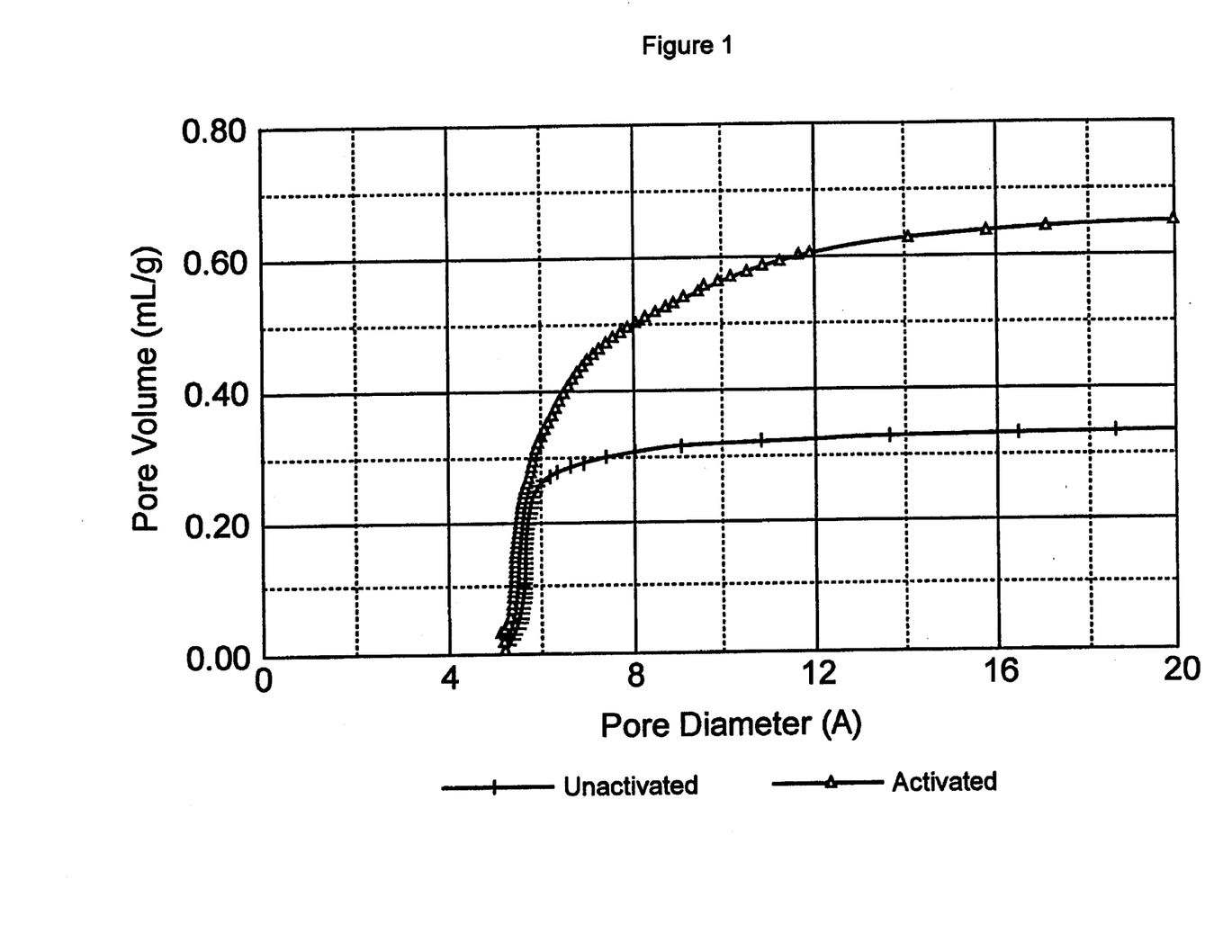
FIG. 1 is a plot of pore diameter vs. pore volume for carbon molecular sieve particles of the invention.

Since in many cases, including the carbon molecular sieves of the inventors, it will be necessary to remove carbon to increase the size of the pores produced by the carbonization of the PVDC precursor polymer, gas phase reactions which can remove carbon are used. For example, steam, carbon dioxide, and oxygen have been suggested for this purpose. Each reaction produces carbon oxides, which are volatile and easily removed from the carbon. However, the location of the attack on the carbon is incompletely understood. For example, the reaction of carbon dioxide on the inventors carbon molecular sieves is shown in FIG. 1 to increase the pore volume in a non-linear manner. That is, the pore size distribution is broadened. The unactivated carbon has most of its pore volume between 5 and 8–12 Å (0.5 nm and 0.8–1.2 nm) while the activated carbon has nearly doubled the pore volume and added most of that volume above 6 Å (0.6 nm). It would be expected that a carbon having a wider distribution of pore sizes than that of the inventors carbon mole sieves would become even less well defined after undergoing an activation process. Thus, there is an advantage in beginning with a sharply defined pore size.

The effect of activation on carbon molecular sieves is further shown in FIG. 3. The carbon molecular sieves as made are represented by 100%, that is, no carbon has been removed by activation. It will be seen that the curve rises steeply and the carbon has most of its pore volume between 5 and 6 Å (0.5 to 0.6 nm). The curve designated 84.6% carbon was obtained after activation with carbon dioxide at 800° C. for 1.5 hours. The total pore volume has been substantially increased, but the characteristic molecular sieve curve is still seen, that is, it has been shifted so that most of the pore volume (at least 80%) is found between pore sizes of 5.5 and 6.5 Å (0.6 to 0.65 nm), more precisely between 6 and 6.5 Å (0.6 and 0.65 nm). The activation process can be too severe, illustrated by the curve designated 48.3% carbon representing activation with carbon dioxide at 800° C. for 8.5 hours. Here the curve is losing its characteristic shape and evidently both larger and smaller pores have been created. The fraction of the pores in the range of 5.5 to 6.5 Å (0.55 to 0.65 nm) will be quite small. If the optimum pore size is in this range, as the inventors believe, then the capacity of the over-activated carbon for storing methane will be significantly lower, as Example 16 will show, despite the larger total pore volume.

A process for activating carbon molecular sieves by removing carbon must involve a number of factors. As suggested above one would attempt to selectively increase the pore size so that the optimum total pore volume and pore size distribution is achieved. The temperature at which the reactive gas contacts the carbon will be of particular importance. Preferably the temperature will be at least 750° C. In some cases, it may be desirable to use staged temperatures where more than one contacting step is used. As with many chemical reactions the time at which the reactive gas is in contact with the carbon will have to be considered. The concentration of the reactive gas could be an important factor in determining the rate at which the carbon is removed. It may be desirable to vary the concentration during the process or it may be preferred to carry out the activation process in a series of steps so that the process can be more readily controlled. Activation of the pores in the inventors carbon mole sieves is possible in more than one variation and should not be limited to the specific processes described in the examples below. It has been found that activation can be carried out to optimize the pores of the carbon molecular sieves so that the amount of natural gas adsorbed at pressure and then delivered at 0 psig is maximized. This is contrary to the conclusion of some workers in the art.

Example 1

This example illustrates the production of CMS pellets beginning with the bulk polymerization of a polyvinylidene chloride cross-linked with divinyl benzene. The monomers were purified by contact with activated carbon (Calgon PCB, 20×50 mesh) at the ratio of 2 grams activated carbon per 100 mL of the monomer and the divinyl benzene to remove any polymerization inhibitors. 0.1 gram of AIBN solids were introduced into a 125 mL Teflon-lined Parr bomb. 82.4 mL of vinylidene chloride monomer and 1 mL divinylbenzene were transferred into the reactor and the reactor was sealed and shaken. The reactor was then kept in an oven at 70° C. for at least 8 hours. Then, the polymer products were collected and weighed. The yield of polymerization reaction product was determined after the polymer was evacuated until a constant weight was obtained.

The polymer was then pulverized with an electric blender. Cylindrical pellets of 3.2 millimeter diameter and 3.2 mm height (aspect ratio 1/1) were made with a handpress.

A pellet was carbonized by heating in a one-inch diameter quartz tube placed in a tube furnace. A steady stream of nitrogen was introduced into the quartz tube for at least 30 minutes prior to the heating of the furnace. The temperature of the furnace was increased at 110° C. per hour to the final temperature of 900° C. and then held for one and one-half hours before the product was allowed to cool to room temperature.

Example 2

This example illustrates the preparation of the polymer using solution polymerization. The same general procedure used in the Example 1 for the purification of the monomer and cross-linking agent were followed. A 125 mL Parr bomb as described in the previous example was filled to about 85 mL. The ratio of vinylidene chloride to solvent (orthodichlorobenzene) was maintained at 1:1.5. Divinyl benzene was included at 0.5 wt. % relative to the vinylidene chloride. The reactor was held at 70° C. for 21 hours. A polymer yield of 50.9 weight percent was obtained, with the solvent being removed from the polymer products by a vacuum ($10^{-3}$ mm mercury $1.33\times10^{-4}$ kPa absolute) until a constant weight was obtained. The material was then pulverized, shaped and carbonized as described in Example 1.

Example 3

Polymers were produced using emulsion polymerization techniques. 43.7 grams of vinylidene chloride was mixed with 0.9 g of divinylbenzene cross-linking agent. Both of these materials had been purified as previously described in Example 1. The mixture was added to 137.8 g of a mixture containing 1.35 g of ammonium sulfate, 0.67 g of hydrazine sulfate, 0.81 g of sodium hydroxide and 135 g of distilled water which formed the continuous phase during the polymerization. 0.45 g of sodium lauryl sulfate was added to aid in formation of the emulsion. This admixture was maintained in a rapidly agitated 500 mL reactor maintained at a temperature of 25° C. for 24 hours. The polymer was recovered and then pulverized, pressed into pellets and carbonized following the procedure described for Example 1.

Example 4

In another preparation a carbon molecular sieve was made by suspension polymerization using only vinylidene chloride (VDC). 140.6 g of commercial grade VDC (PPG Industries, Inc.) were passed through 40 mL of PCB activated carbon to remove the inhibitor content. Then 0.141 g of azobisisobutytonitrile (AIBN) was dissolved in the VDC. The VDC was then slowly added to 703.03 g of an aqueous solution containing 0.6% hydropropyl methyl cellulose and agitation of a 1000 mL Parr reactor was begun at 10–100 rpm. The vessel containing the mixture was held in a constant temperature bath at 70° C. for about 8 hours, to complete the polymerization of VDC. The polymer was produced as spherical beads of about 2 mm diameter. These were recovered, washed with water, and dried at 100° C. The VDC polymer was carbonized either as produced or else ground to about 100 μm and then pelletized to about 3.2 mm diameter and 3.2 mm height. Samples of the polymer were carbonized in a flowing stream of nitrogen. The temperature was raised from 25° to 175° in 30 min. to 2 hours and held for 2–4 hours. It was then increased at a rate of 100° C. per hour to 700° C. and held for 2 hours before the product was allowed to cool to room temperature.

Example 5

In testing of adsorbent particles the distribution of volume in a packed vessel was determined by the following method. The individual density of the particles ("piece density") was measured by weighing a particle and then dividing that weight by the volume of the particle. Assuming the density of the carbon itself is 2.2 g/mL, the total pore volume of the particle was calculated. The packing density was measured by placing about 10–30 grams of the particles in a 50 mL graduated cylinder and vibrating the cylinder with an electric vibrator (60 cycles/sec) until a constant volume was obtained. The interparticle void volume was then calculated, knowing the particle density and the packing density. The volume of the micropores was measured with Micromeritics ASAP 2000 micropore equipment using methane adsorption at 87.3° K. The pore size distribution was analyzed with a Horvath-Kawazoe method. It was found that the micropores of the carbonized polymer were generally in the region of 5–7 Å (0.5–0.7 nm). Using this information the volume of the pores in the meso pore range and of larger size were calculated by difference from the total pore volume. Photo micrographs have shown that the micro pores are very uniform and elongated in a slit-like configuration.

The results of measurements and calculations have shown that the distribution of space inside a storage vessel packed with carbon particles according to the present invention is different from that found with other carbon adsorbents. The following table provides comparative data.

TABLE A

STORAGE VESSEL UTILIZATION

| Carbon Adsorbent | Volume Distribution (Volume %) | | | | Micro pore % of Total Particle Pore Volume |
|---|---|---|---|---|---|
| | Carbon | Void | Macro + Meso Pores | Micro-pores | |
| ASRT-CMS[1] | 28.5 | 34.0 | 8.8 | 28.7 | 76.5 |
| ASRT CMS[2] | 32.1 | 35.3 | 2.6 | 30.0 | 92.0 |
| ASRT CMS[3] Disks | 46.0 | 3.3 | 6.8 | 43.9 | 86.6 |
| Calgon BPL[4] | 23.0 | 37.0 | 23.0 | 17.0 | 42.5 |
| Anderson AX-21[4] | 14.0 | 33.0 | 37.0 | 16.0 | 30.2 |
| Saran B Carbon[4] Disk-shaped pieces | 38.0 | 7.0 | 23.0 | 32.0 | 58.2 |

(1) Carbonized PVDC pellets 6–10 mesh, piece density 0.959 g/mL, packing density 0.633 g/mL
(2) Carbonized PVDC pellets 8–10 mesh, piece density 1.103 g/mL, packing density 0.714 g/mL
(3) Carbonized PVDC disks 2.21 cm. diameter × 0.685 cm. thick, piece density 1.057 g/mL, packing density 1.022 g/mL
(4) S. S. Barton, J. A. Holland and D. F. Quinn, "The Development of Adsorbent Carbon for the Storage of Compressed Natural Gas", Ontario Ministry of Energy Report No. AF-85-01, May, 1985. Calgon BPL is an activated carbon produced by Calgon, Anderson AX-21 is a highly activated carbon produced by Anderson Carbon, and Saran B is a carbon disk prepared from Saran polymers by the Royal Military College of Canada.

It can be seen that, compared to other carbons, the carbon molecular sieves of the invention have a larger fraction of micropores (0.4 nm to 2.0 nm), which are considered most important in achieving a high capacity for natural gas. It can also be seen that disks formed of carbon would be a preferred shape since the void volume is substantially reduced. However, the advantage of the carbon molecular sieves of the invention is in the larger volume of micropores in each particle, regardless of the shape used.

Example 6

Measurement of the methane capacity of the carbon pellets of Example 1 was carried out in quartz or stainless steel containers having volumes of 40, 46, and 80 mL. The pellets were packed into the container using an electric vibrator to obtain the maximum packing density. The container was evacuated to 1 m tort (0.001 mm Hg) and heated to 175° C. for 4 hours. After cooling to room temperature, the weight of the container and contents was measured and then methane gas was introduced at various pressures. The temperature was measured by a thermocouple placed in the center of the bed of pellets. After equilibrium was reached, the container was weighed again and the total methane uptake determined. This includes methane in the micropores, the meso and macro pores, and the void space between pellets.

Some data taken by the above method which compare carbon molecular sieves of the invention with some commercially available carbons are given in the following table.

TABLE B

| | Norit Carbon [1] | | | PCB-20 × 50 [2] | | | ASRT CMS [3] | | | Bergbau-Forschung [4] CMS | | | Saran Carbon [5] (Dacey) | (Barton) |
|---|---|---|---|---|---|---|---|---|---|---|---|---|---|---|
| Cell Volume | 81.0 | | | 81.0 | | | 81.0 | | | 81.0 | | | | |
| Wt - | | | | | | | | | | | | | | |
| packed | 32.42 | | | 39.43 | | | 42.53 | | | 57.87 | | | | |
| dried | 31.37 | | | 36.08 | | | 40.95 | | | 57.00 | | | | |
| Packing Density | 0.387 | | | 0.445 | | | 0.506 | | | 0.704 | | | | 0.32 |
| Methane Uptake Pressure | wt. | (g/g)' | (g/g) | wt. | (g/g)' | (g/g) | wt. | (g/g)' | (g/g) | wt. | (g/g)' | (g/g) | (g/g) | (g/g) |
| 100 psig (790.6 kPa abs.) | .2.17 | 0.0677 | 0.05887 | 2.42 | 0.0671 | 0.0599 | 3.25 | 0.0790 | 0.0737 | 2.39 | 0.0419 | 0.0382 | | |
| 200 psig (1,479 kPa abs.) | 2.94 | 0.0937 | 0.0767 | 3.27 | 0.0906 | 0.0770 | 4.03 | 0.0984 | 0.0880 | 2.97 | 0.0521 | 0.0449 | | |
| 300 psig (2,169 kPa abs.) | 3.57 | 0.1138 | 0.0862 | 3.94 | 0.1095 | 0.0888 | 4.61 | 0.1126 | 0.0963 | 3.41 | 0.0598 | 0.0487 | 0.087 | 0.070 |
| $(V/V)_{300}$ | | 68 | | | 76 | | | 88 | | | 65 | | 51 | |

(1) Norit Carbon is an activated carbon produced by American Norit Co., Inc.
(2) PCB-20 × 50 is an activated carbon produced by Calgon.
(3) ASRT CMS is a carbon molecular sieve produced by a cross-linked PVDC polymer according to the invention.
(4) Bargbau-Forshcung is a carbon molecular sieve produced by Bergbau-forshung.
(5) From S. S. Baron et al., "High Pressure Adsorption of the Methane on Porous Carbons", "Fundamentals of Adsorption", 1st Engineering Foundation Conference, 1984, p. 65.

The values of (g/g)' represent the total methane uptake per gram of carbon, while the values of (g/g) give the capacity of the micropores of the carbon. The total volume of the methane stored at pressure is given as $(v/v)_{300}$. It is calculated by the formula $(v/v)_{300}$=(total $CH_4$ stored at 300 psig or 2,169 kPa abs.)÷0.000643 g/mL÷cell volume where 0.000643 g/mL is the density of $CH_4$ at delivery conditions (29.40 in. Hg or 746 mm Hg, 26.3° C.).

It can be seen that the carbon molecular sieve of the invention has a higher capacity for methane storage than activated carbons or the commercial carbon molecular sieves which were tested.

Example 7

The measurements of Example 6 were made on carbon molecular sieves prepared as in Examples 1 and 4. They are compared below, along with another carbon molecular sieve made as in Example 4 but in a larger scale preparation. The results are presented in the table below.

TABLE C

| Preparation Method | Packing Density (g/mL) | Storage Temp. (°C.) | Storage Capacity at 300 psig | | |
|---|---|---|---|---|---|
| | | | $(g/g)'_{300}$ | $(g/g)_{300}$ | $(V/V)_{300}$ |
| Example 1 | 0.506 | 25 | 0.1126 | 0.0963 | 88 |
| Example 4 | 0.629 | 24 | 0.1100 | 0.0995 | 106 |
| " | 0.692 | 24 | 0.1076 | 0.0992 | 114 |
| Example 4 scale-up | 0.633 | 24 | 0.1132 | 0.1031 | 109 |
| Example 4 scale-up | 0.629 | 25 | 0.1101 | 0.0996 | 106 |
| Example 4 scale-up | 0.693 | 25 | 0.1103 | 0.1018 | 115 |
| Example 4 scale-up | 0.697 | 25 | 0.1090 | 0.1008 | 116 |
| Example 4 scale-up | 1.022 | 25 | 0.0995 | 0.0979 | 159 |
| Example 4 scale-up | 0.575 | 27 | 0.1111 | 0.0984 | 99 |

All of the samples were carbonized pellets except for the one sample in the form of disks which more effectively uses the space available in the test vessel. The above results may be compared with more conventional carbon adsorbents shown in the table below.

TABLE D

| Carbon Ab-sorbent | Packing Density g/mL | Storage Temp. (°C.) | Storage Capacity at 300 psig | | |
|---|---|---|---|---|---|
| | | | $(g/g)'_{300}$ | $(g/g)_{300}$ | $(V/V)_{300}$ |
| Norit Carbon [1] | 0.387 | 24 | 0.1138 | 0.0892 | 69 |
| Calgon PCB-1 [2] | 0.445 | 23 | 0.1095 | 0.0899 | 76 |
| Calgon PCB-2 [3] | 0.500 | 27 | 0.1018 | 0.0845 | 79 |
| Nuchar WV-B [3] | 0.259 | 25 | 0.1142 | 0.0690 | 46 |
| Anderson AX-21 [4] | 0.355 | 25 | 0.1569 | 0.1305 | 87 |
| Saran [5] Carbon | 0.320 | 25 | — | 0.070 | 51 |

(1) Norit Carbon is an activated carbon produced by American Norit Co, Inc.
(2) Calgon PCB-1 is an activated carbon produced by Calgon.
Calgon PCB-2 is an activated carbon produced by Calgon.
(3) Nuchar WV-B is an activated carbon produced by Westvaco.
(4) Anderson AX-1 is an activated carbon produced by Anderson Development Co.
(5) Barton et al. "High Pressure Adsorption of Methane on Porous Carbons" Fundamental of Adsorption, 1st Engineering Foundation Conference, 1994, p. 65

Example 8

A sample of 2 mm diameter beads of a carbon molecular sieve made by the procedures of Example 4 was tested for its adsorption of water from air having various amounts of water vapor. The results are given in the following table.

TABLE E

| Water Loading, g/g | % Relative Humidity |
|---|---|
| 0 | 0 |
| 0.002 | 20 |
| 0.014 | 40 |
| 0.030 | 60 |

It will be evident that adsorption of water should be avoided since water vapor would reduce the capacity of the carbon molecular sieve for methane. Conventional carbons which are not hydrophobic show a much greater capacity for water with increasing humidity.

Example 9

Polymer pellets produced by the process of Example 4 were carbonized by heating in $N_2$ or $CO_2$. The programmed heating, the inert gas used, and the results are shown in the following table.

TABLE F

| Sample # | Gas | Program Heating Rate (°C./hr) at 140–180° C. | Carbonization Maximum Temperature (°C.) | Time (h) | Carbon Yield (%) | Piece Density (g/mL) | $CH_4$ BET Surface Area ($m^2$/g) | Micropore Volume (mL/g) |
|---|---|---|---|---|---|---|---|---|
| 1 | $N_2$ | 100 | 705 | 2.0 | 25.454 | 0.607 ± 0.218 | 1397 | 0.442 |
| 2 | $N_2$ | 25 | 700 | 2.0 | 25.696 | 0.968 ± 0.055 | 1298 | 0.429 |
| 3 | $N_2$ | 2 | 700 | 2.0 | 25.701 | 1.023 ± 0.055 | 1337 | 0.422 |
| 4 | $N_2$ | 2 | 711 | 2.0 | 25.625 | 0.994 ± 0.043 | 1349 | 0.426 |
| 5 | $CO_2$ | 2 | 709 | 2.0 | 25.068 | 0.990 ± 0.049 | 1373 | 0.427 |
| 6 | $CO_2$ | 2 | 854 | 2.0 | 21.349 | 0.847 ± 0.078 | 2145 | 0.650 |
| 7 | $CO_2$ | 2 | 802 | 2.25 | 22.829 | 0.912 ± 0.076 | 1800 | 0.544 |
| 8 | $CO_2$ | 3 | 781 | 0.25 | 24.395 | 0.956 ± 0.039 | 1366 | 0.418 |
| 9 | $CO_2$ | 3 | 785 | 0.25 | 24.521 | 0.929 ± 0.046 | 1706 | 0.523 |
| 10 | $CO_2$ | 3 | 795 | 2.0 | 22.974 | 0.896 ± 0.046 | 1784 | 0.549 |
| 11 | $CO_2$ | 4 | 790 | 2.0 | 23.297 | 0.917 ± 0.033 | 1757 | 0.538 |
| 12 | $CO_2$ | 6 | 789 | 2.0 | 23.096 | 0.868 ± 0.031 | 1606 | 0.498 |
| 13 | $CO_2$ | 1 | 798 | 6.0 | 21.523 | 0.865 ± 0.078 | 1787 | 0.551 |

The results of samples 1–4 suggest that rapid heating of the polymer pellets in the range of 140°–180° C., where PVDC is known to begin decomposing, provides a lower density product and thus heating in that temperature range should be slower in order to increase the particle (piece) density, which will increase the amount of carbon which can be stored in a given container. Interestingly, the change in heating rate does not appear to significantly affect the surface area or the micropore volume.

The result of Sample 5 shows that the use of $CO_2$ as the purging gas has no effect on the surface area or micropore volume when the carbonization is done with a maximum temperature of about 700°–710° C. However, increasing the maximum carbonization temperature (Samples 6–13) provides an increase in surface area and micropore volume, with some decrease in piece density. It appears that an activation effect is obtained.

Example 10

Several methods of activating carbon molecular sieves were compared, with the results shown in the following table. In each case the polymer precursor was prepared using the suspension polymerization described in Example 4 and carbonized by the procedure described in Example 4. For the steam activation, a stream of $N_2$ passed through a water evaporator heated at 75° C. This $N_2$ containing $H_2O$ vapor was sent to the quartz reactor containing the carbon molecular sieve while the carbon sample was heated at 825° C. For $CO_2$ activation, a pure (100%) $CO_2$ was used with a carbon sieve temperature of 800° C.

TABLE G

| Sample | Activating Gas | Activation Conditions | Yield after Activation | Packing Density, g/mL | BET Surface Area, $m^2$/gm | Micropore Volume, mL/gm |
|---|---|---|---|---|---|---|
| 14 | None (base) | None | 100 | 0.633 | 1484 | 0.45 |

TABLE G-continued

| Sample | Activating Gas | Activation Conditions | Yield after Activation | Packing Density, g/mL | BET Surface Area, $m^2$/gm | Micropore Volume, mL/gm |
|---|---|---|---|---|---|---|
| 15 | Steam | 825° C. | 65.8 | 0.435 | 1861 | 0.56 |
| 16 | $CO_2$ | 800° C. | 73 | 0.469 | 1864 | 0.56 |

It can be seen that the result of removing carbon from the carbon molecular sieve by reaction with steam or $CO_2$ reduces the packing density since there is less carbon present. Also, the surface area and micropore volume are increased as the pores are enlarged.

Example 11

The effect of activating carbon molecular sieves is to increase the stored and deliverable amount of natural gas, resulting from the increase in micropore volume. The carbon molecular sieves were produced by carbonizing in nitrogen at a maximum temperature of 700° C. the polymer precursors made by the suspension polymerization process described in Example 4. The activation conditions are given along with the capacity for methane in the following table.

TABLE H

| Sample | Particle Form | Activating Gas | Activating Conditions | Carbon Yield % | Packing Density, g/mL | $(g/g)_o$ | $(g/g)_{300}$ | $(v/v)_{300}$ | $\Delta(v/v)_{300}$ |
|---|---|---|---|---|---|---|---|---|---|
| 17 | 2.3 mm Pellet | None (base) | N/A | 100 | 0.633 | 0.0300 | 0.1031 | 111.53 | 81.50 |

TABLE H-continued

| Sample | Particle Form | Activating Gas | Activating Conditions | Carbon Yield % | Packing Density, g/mL | $(g/g)_o$ | $(g/g)_{300}$ | $(v/v)_{300}$ | $\Delta(v/v)_{300}$ |
|---|---|---|---|---|---|---|---|---|---|
| 18 | 2.3 mm Pellet | $CO_2$ | 800° C. 9 hr. | 77.3 | 0.545 | 0.0319 | 0.133 | 122.2 | 94.6 |
| 19 | 2.3 mm Pellet | $CO_2$ | 800° C. 11.2 hr. | 70.3 | 0.544 | 0.0304 | 0.1401 | 127.62 | 101.36 |
| 20 | 2.3 mm Pellet | Steam | 825° C. 67 min. | 68.5 | 0.492 | 0.0247 | 0.1363 | 114.82 | 95.29 |
| 21 | Disk | None (base) | N/A | 100 | 1.022 | 0.0300 | 0.1001 | 158 | 110.80 |
| 22 | Disk | $CO_2$ | 800° C. 14.5 hrs. | 77.1 | 0.837 | 0.0277 | 0.1334 | 173.20 | 137.20 |

The disks (samples 21,22) were carbon molecular sieves with a diameter of 21 mm and a thickness of 6.5 mm. By minimizing void space between the particles, these disks provide a higher storage capacity based on volume than do the pellets of samples 17–20. It will be seen that the activation process, although it removes carbon, provides improved storage capacity. However, there is an optimum activation, as will be seen.

Example 12

Two samples of carbon molecular sieves were measured by methane adsorption at 87.3° K. as previously discussed to determine the size and distribution of the micropores. Both samples had been prepared by carbonizing PVDC polymer made by the suspension polymerization method described in Example 4. They were carbonized by heating in nitrogen to 700° C. for 2 hours. One sample was measured as produced, while the second was activated by reacting it with $CO_2$ for 7 hrs. at 800° C. The micropore volume and pore diameter are shown in FIG. 1.

It will be evident that as carbonized the carbon molecular sieves have a pore diameter of about 5–6 Å (0.5–0.6 nm) with only a minor portion of the pores being larger (the curve changes rapidly from a vertical line to a horizontal one). The activated carbon molecular sieve has a radically different curve. A much larger pore volume has been achieved, but not within the desired region. The volume has been added above 6 Å (0.6 nm). This result may be compared with a preferred carbon molecular sieve of FIG. 3 (84.5% carbon) which has a smaller total pore volume, but a large fraction is in the range of 6–6.5 Å (0.6–0.65 nm). The curve for 48.3% carbon appears closer to the curve of FIG. 1 and one may conclude that too much carbon had been removed.

Example 13

Figure 2:
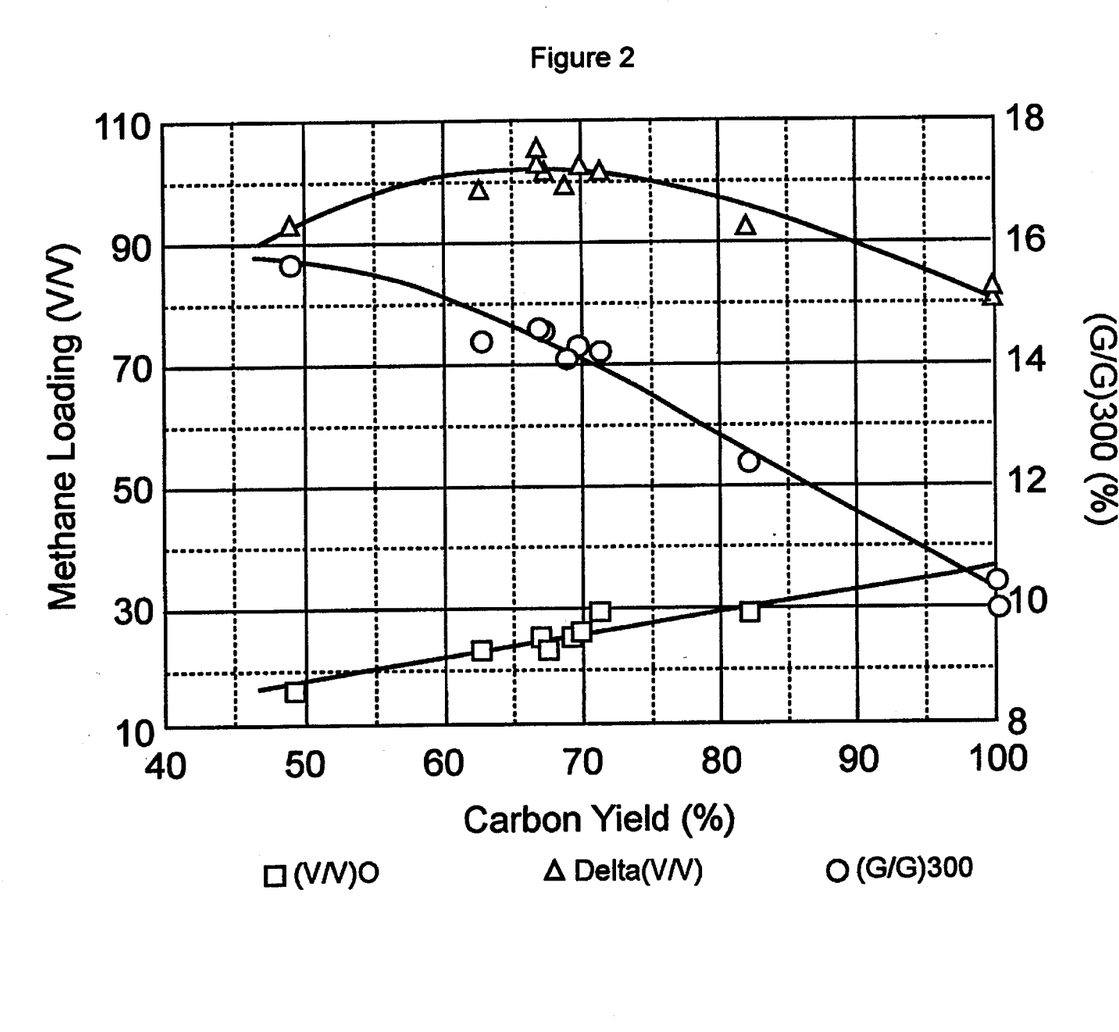
FIG. 2 is a plot showing the effect of activation on methane capacity.

To determine whether an optimum pore size and distribution can be expected when carbon molecular sieves are activated to increase the micropore volume, samples of PVDC precursor polymer produced using the suspension polymerization method described in Example 4 were carbonized by heating in nitrogen at 700° C. for 2 hrs. Then, samples were given activation treatments with $CO_2$ at varying temperatures and times to increase the total pore volume. The samples were tested for methane capacity as described previously. The results are shown in FIG. 2.

Unactivated carbon molecular sieves are shown as 100% carbon yield. As the severity of the activation is increased, the carbon yield goes down (carbon is oxidized and removed). At the same time the methane loading at the discharge pressure decreases rather than increasing as might be expected since there is less carbon present and the space available to hold methane at discharge pressure has increased. However, it is found that the $\Delta(v/v)$, that is, the amount of methane discharged increases until 60–70% of the initial carbon remains, after which the ability of the carbon to deliver methane begins to drop off. The specific capacity of the carbon at pressure $(g/g)_{300}$ also increases to a maximum and then decreases. Consequently, it is believed that the increase of the pore size resulting from the activation procedure has provided a larger capacity for methane, but only insofar as the pores do not become so large that the density of the methane is reduced.

The carbon molecular sieves can absorb natural gas at 300 psig (2,169 kPa abs.) and deliver at 0 psig (101.32 kPa abs.) at least 70 times the volume of the vessel, preferably at least 95, most preferably at least 110 times the vessel volume, as the data suggests.

Example 14

The effect of activating carbon molecular sieves is to modify and optimize the pore structure and the total pore volume of the adsorbent material. The carbon molecular sieves were produced by carbonizing in nitrogen at a maximum temperature of 700° C. the polymer precursors made by the suspension polymerization process in a commercial plant (500 gallons) using a similar process to that described in Example 4. The carbonized pellets were then activated in a stream of $CO_2$ at 800° C. for a period of 1.5 and 8.5 hours, respectively. The resulting carbon molecular sieves with carbon yields of 84.6 and 48.3% respectively were studied for their pore structures and total pore volumes along with the unactivated material (100% yield).

The adsorbent characterization was conducted at 87.3% K. in a Micromeritics ASAP 2000 micropore instrument using methane as the adsorbate. Methane uptakes by the adsorbent at various $CH_4$ vapor pressures were measured. These data were analyzed with the Horvath-Kawazoe method (G. Horvath and J. Kawazoe, J. Chem. Eng. Japan 16(6), 470 (1983)) for the pore size distribution and the total pore volume. Results of the study are illustrated in FIG. 3 and discussed above, with the conclusion that removing too much carbon by the activation procedure provides a carbon similar to activated carbon and lacking the unique narrow pore size characteristic of the carbon molecular sieve.

Example 15

Figure 4:
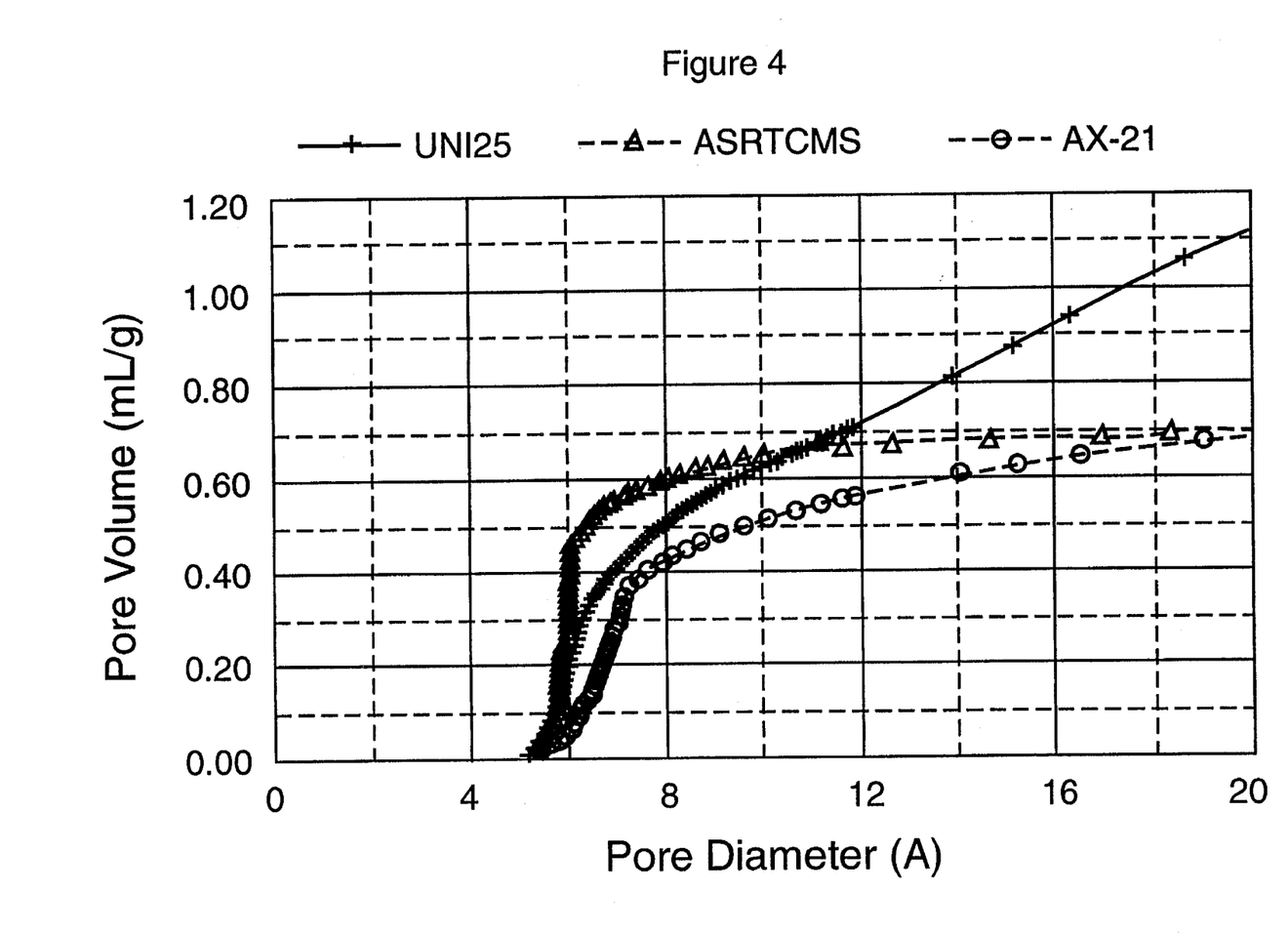
FIG. 4 is a plot of pore diameter vs. pore volume for carbon molecular sieves of the invention and two commercial activated carbons.

Commercial carbon adsorbents, AX-21 (Anderson Development Company) and UNI 25 (Kansai Tar and Chemical Products Co., Ltd.) were also studied in the Micromeritics ASAP 200 with the method described in Example 14. The comparison of the properly activated carbon molecular sieves of the invention with precursor molecular sieves (as made) and over-activated molecular sieves has been discussed previously. FIG. 4 illustrates that commercial activated carbons such as AX-21 and UNI 25 do not exhibit the same large capacity at a narrow band of pore sizes as does the carbon molecular sieves of the invention, which have been made and activated to provide the highest capacity for methane obtained to this time.

Example 16

It is clear that these carbon molecular sieves, all being from the same source, are quite different and can be readily distinguished by the portion of the pore volume which is within a narrow band, most broadly, 5.5 to 6.5 Å (0.55 to 0.65 nm), particularly 6 to 6.5 Å (by the Horvath-Kawazoe method). One might expect that the amount of methane which can be stored by each of these carbon molecular sieves would be determined by the total pore volume, that is, the as-made carbon (100%) would have the least capacity, the 84.6% activated carbon would be substantially better, and the 48.3% activated carbon would be even better, since their total pore volumes are about 0.34 mL/g, 0.48 mL/g and 0.7 mL/g respectively. In fact, they store methane quite differently as shown in the following table, which compares the volumetric capacity for methane of carbon molecular sieve pellets, as prepared and activated.

TABLE I

| % Carbon | Stored Methane mL $CH_4$ mL carbon (300 psig) |
| --- | --- |
| 100 | 118 |
| 84.5 | 154 |
| 48.3 | 142 |

These values are consistent with the curve of Δ v/v for a vessel packed with carbon molecular sieve particles shown in FIG. 2 which illustrates that an optimum activation occurs when about 70% of the carbon has been removed. The superior capacity of the 84.5% activated carbon is attributed to the fact that a large fraction of its pore volume is within the narrow range of 6 to 6.5 Å (0.6 to 6.5 nm).

It should be pointed out that in the inventors' view the volumetric capacity of the pellets should be emphasized rather than the weight capacity since in practice the volume of a vessel containing the pellets will be more important than its weight. In vehicular applications the space needed for fuel storage is particularly important and the weight of the pressure vessel increases with its volume. Consequently, the capacity of a given volume for storing methane is used as the criteria for optimizing the carbon molecular sieves of the invention.

What is claimed:

1. An adsorbent particle for storing natural gas consisting essentially of a hydrophobic carbon molecular sieve having a pore volume of at least 0.4 mL/g and at least about 80% of its particle pore volume consisting of micropores having diameters greater than 0.55 nm and less than 0.65 nm.

2. An adsorbent particle of claim 1 wherein at least about 60% of the total pore volume consists of micropores having a diameter of about 0.6 to 0.65 nm.

3. An adsorbent particle of claim 1 wherein the capacity for methane of said micropores is at least 110 mL methane/ mL carbon at a pressure of 300 psig (2,169 kPa abs.).

4. An adsorbent particle of claim 3 wherein the capacity for methane of said micropores is at least 145 mL methane/ mL carbon.

5. An adsorbent particle of claim 1 wherein said carbon molecular sieve is a carbonized polymer of vinylidene chloride.

6. An adsorbent particle of claim 5 wherein said micropores have a slit-like shape.

7. An adsorbent particle of claim 5 wherein said carbon molecular sieve is a carbonized polymer of vinylidene chloride which has been activated by contact with carbon dioxide at a temperature of at least 750° C.

8. An adsorbent particle of claim 1 having the shape of spheres or cylinders having an aspect ratio of about 1/1.

9. An adsorbent particle of claim 1 having the shape of a flat disk.

10. A method of preparing a carbon molecular sieve comprising the steps of:
    (a) combining and mixing in an aqueous solution 10 to 50% vinylidene chloride, 0.1 to 2.0% of a suspending agent, and a polymerization initiator;
    (b) heating said combined aqueous solution of (a) to a temperature of about 40° to 80° C.;
    (c) maintaining said heated mixture of (b) for a time sufficient to polymerize vinylidene chloride;
    (d) recovering the polymerized vinylidene chloride of (c);
    (e) carbonizing the recovered vinylidene chloride polymer of (d) in an inert atmosphere to produce a carbon molecular sieve having at least about 90% of its pore volume between about 0.5 and 0.6 nm;
    (f) activating the carbonized polymer of (e) by heating in the presence of steam, carbon dioxide, or oxygen to increase the micropore size and provide at least about 80% of its pore volume between about 0.55 and 0.65 nm.

11. The method of claim 10 wherein said suspending agent is hydroxy propyl methyl cellulose.

12. The method of claim 10 wherein said activation of (e) comprises heating said carbonized polymer in carbon dioxide to a temperature of at least 750° C.

13. The method of claim 10 wherein the carbon density is increased by heating said polymer during the carbonization of (e) in the range of about 140°–180° C. at a rate up to about 25° C./hr.

14. The method of claim 13 wherein said heating is at a rate of about 2° to 10° C./hr.

\* \* \* \* \*